United States Patent
Thomas

(10) Patent No.: US 6,917,468 B2
(45) Date of Patent: Jul. 12, 2005

(54) CONFOCAL MICROSCOPE

(75) Inventor: Sure Thomas, Schoeffengrund (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 0 days.

(21) Appl. No.: 10/189,245

(22) Filed: Jul. 5, 2002

(65) Prior Publication Data

US 2003/0011881 A1 Jan. 16, 2003

(30) Foreign Application Priority Data

Jul. 6, 2001 (DE) ............... 101 33 017

(51) Int. Cl.⁷ .................... G02B 21/00
(52) U.S. Cl. .............. 359/381; 359/368; 359/383
(58) Field of Search ............... 359/368–390, 359/618–630, 224–227

(56) References Cited

U.S. PATENT DOCUMENTS

| | | | | |
|---|---|---|---|---|
| 2,601,175 A | * | 6/1952 | Smith | 359/371 |
| 3,013,467 A | | 12/1961 | Minsky | |
| 4,515,445 A | * | 5/1985 | Muller et al. | 358/386 |
| 4,917,478 A | | 4/1990 | Petran et al. | |
| 5,032,720 A | | 7/1991 | White | 250/236 |
| 5,035,476 A | * | 7/1991 | Ellis et al. | 359/202 |
| 5,506,725 A | * | 4/1996 | Koike et al. | 359/388 |
| 6,028,306 A | * | 2/2000 | Hayashi | 250/235 |
| 6,211,988 B1 | | 4/2001 | Engelhardt et al. | |
| 6,580,518 B2 | * | 6/2003 | Eda et al. | 356/609 |
| 6,738,189 B1 | | 5/2004 | Ulrich et al. | 359/368 |

FOREIGN PATENT DOCUMENTS

| | | |
|---|---|---|
| DE | 1 083 065 | 6/1960 |
| DE | 38 21 403 A1 | 1/1989 |
| DE | 40 23 650 A1 | 1/1992 |
| DE | 40 40 441 A1 | 7/1992 |
| DE | 43 23 129 A1 | 2/1994 |
| DE | 44 37 896 C1 | 5/1996 |
| DE | 196 54 208 C2 | 6/1998 |
| DE | 196 54 210 A1 | 6/1998 |
| DE | 198 35 072 A1 | 2/2000 |
| DE | 200 12 378 U1 | 11/2000 |
| DE | 199 42 998 A1 | 3/2001 |
| DE | 100 17 823 A1 | 10/2001 |
| EP | 0 727 684 B1 | 12/2000 |
| JP | 5-288992 | * 11/1993 ............ 359/386 |

OTHER PUBLICATIONS

J. Schlichting et al., "Licht Aus Dem Objectiv. –Light From the Lens System", F&M Feinwerktechnik Mikrotechnik Mikroelectronik, Carl Hanser GmbH & Co., Bd. 105, No. 6, Jun. 1, 1997, pp. 447–448, 450.

* cited by examiner

Primary Examiner—Thong Q. Nguyen
(74) Attorney, Agent, or Firm—Foley & Lardner LLP

(57) ABSTRACT

A confocal microscope has an illumination beam path of a light source, a detection beam path of a detector, a scanning device, optics combining and separating the illumination beam path and detection beam path, and an objective, in which both an incident specimen illumination and a transmitted specimen illumination are possible. The confocal microscope according to the present invention is characterized in that in order to switch over from an incident specimen illumination occurring through the objective to a transmitted specimen illumination occurring toward the objective, beam deflection optics and optionally beam-shaping optics can be introduced on the side of the specimen plane facing away from the objective.

22 Claims, 5 Drawing Sheets

CONFOCAL MICROSCOPE

CROSS REFERENCE TO RELATED APPLICATIONS

This application claims priority from German patent application 101 33 017.0 which is incorporated by reference herein.

FIELD OF THE INVENTION

The present invention concerns a confocal microscope having an illumination beam path of a light source, a detection beam path of a detector, a scanning device, a means combining and separating the illumination beam path and detection beam path, and an objective.

BACKGROUND OF THE INVENTION

Confocal microscopes of the species have been known for some time, and were described for the first time in U.S. Pat. No. 3,013,467 and implemented practically for the first time, for example, in DE 3 821 403 A1. In them, light that passes through a so-called Nipkow disk is used for point-like confocal illumination of a specimen. The light reflected from the specimen travels along the beam path of the microscope in the opposite direction, and the light passing through the Nipkow disk a second time an be detected or perceived by a detector or by the microscope operator's eye. The point-like pinholes of the Nipkow disk act as a confocal point light source and as confocal detection pinholes.

EP 727 684 A2 discloses a confocal optical scanner in which a Nipkow disk again implements confocal illumination and detection. Preceding the Nipkow disk provided therein, on the side facing toward the light source, is a collector disk having microlenses, which focuses the illuminating light of a light source onto the pinholes of the Nipkow disk. The quantity of light passing through the pinholes of the Nipkow disk can thereby be increased.

Confocal microscopes that comprise a confocal disk scanner are used in particular for real-time microscopy, since by rotation of the confocal disk scanner at high speed, confocal images of a specimen can be detected very quickly.

DE 44 37 896 C1 discloses a disk scanner for a confocal microscope in which both the light of a light source serving for illumination and the detected light coming from the specimen are reflected at the disk scanner. Here again, the reflective structures of the disk scanner act as confocal point light sources and detection pinholes.

DE 196 54 210 A1 discloses an optical arrangement for scanning a light beam with which confocal images can be scanned almost at video speed. A confocal microscope equipped with a scanning arrangement of this kind usually has illumination and/or detection pinholes that are responsible for the confocality.

Especially in microscopes having confocal disk scanners, only incident-light illumination, accomplished through the microscope objective, has heretofore been usual. Confocal transmitted-light illumination for the detection of transparent specimens is not readily possible. An illumination beam path that encompasses a light source and a first confocal disk scanner, which confocally illuminates the specimen from the side of the specimen plane facing away from the objective, could nevertheless be provided. For confocal detection, the light coming from the specimen would pass through the objective and a second confocal disk scanner, in which context the first disk scanner would need to rotate synchronously with the second disk scanner. This procedure is complex and difficult to align, and moreover requires a great deal of space.

SUMMARY OF THE INVENTION

It is therefore an object of the present invention to provide and further develop a microscope of the species in which both transmitted specimen illumination and incident specimen illumination are possible.

The confocal microscope of the species according to the present invention achieves the aforesaid object by way of a confocal microscope comprising an illumination beam path of a light source which emits an illuminating light; a detection beam path of a detector; a scanning device; a combining and separating member adapted to combining and separating the illumination beam path and the detection beam path; and an objective, wherein introducing a beam deflection member or a beam-shaping member on the side of the specimen plane facing away from the objective switches from an incident specimen illumination occurring through the objective to a transmitted specimen illumination occurring toward the objective. A confocal microscope of this kind is characterized in that in order to switch over from an incident specimen illumination occurring through the objective to a transmitted specimen illumination occurring toward the objective, beam deflection means and optionally beam-shaping means can be introduced on the side of the specimen plane facing away from the objective.

What has been recognized according to the present invention is firstly that a known arrangement of an incident specimen illumination arrangement of a confocal microscope having only one scanning device can also be operated in transmitted specimen illumination mode if beam deflection means and/or beam-shaping means are introduced into the beam path on the side of the specimen plane facing away from the objective. The light serving for illumination is deflected or reflected by the beam deflection means, i.e. the illuminating light of the light source coming from the objective passes through the specimen and strikes the beam deflection means, is reflected therefrom, and then illuminates the specimen from the side of the specimen plane facing away from the objective, i.e. toward the objective. As a result, advantageously, a second scanning device is not necessary, thereby advantageously simplifying the beam path required for a transmitted specimen illumination. In the last analysis, introduction of the beam deflection means (and optionally the beam-shaping means) lengthens the illuminating beam path so that the illuminating light now travels twice through the specimen region between the objective and beam deflection means.

DETAILED DESCRIPTION OF THE INVENTION

Figure 1:
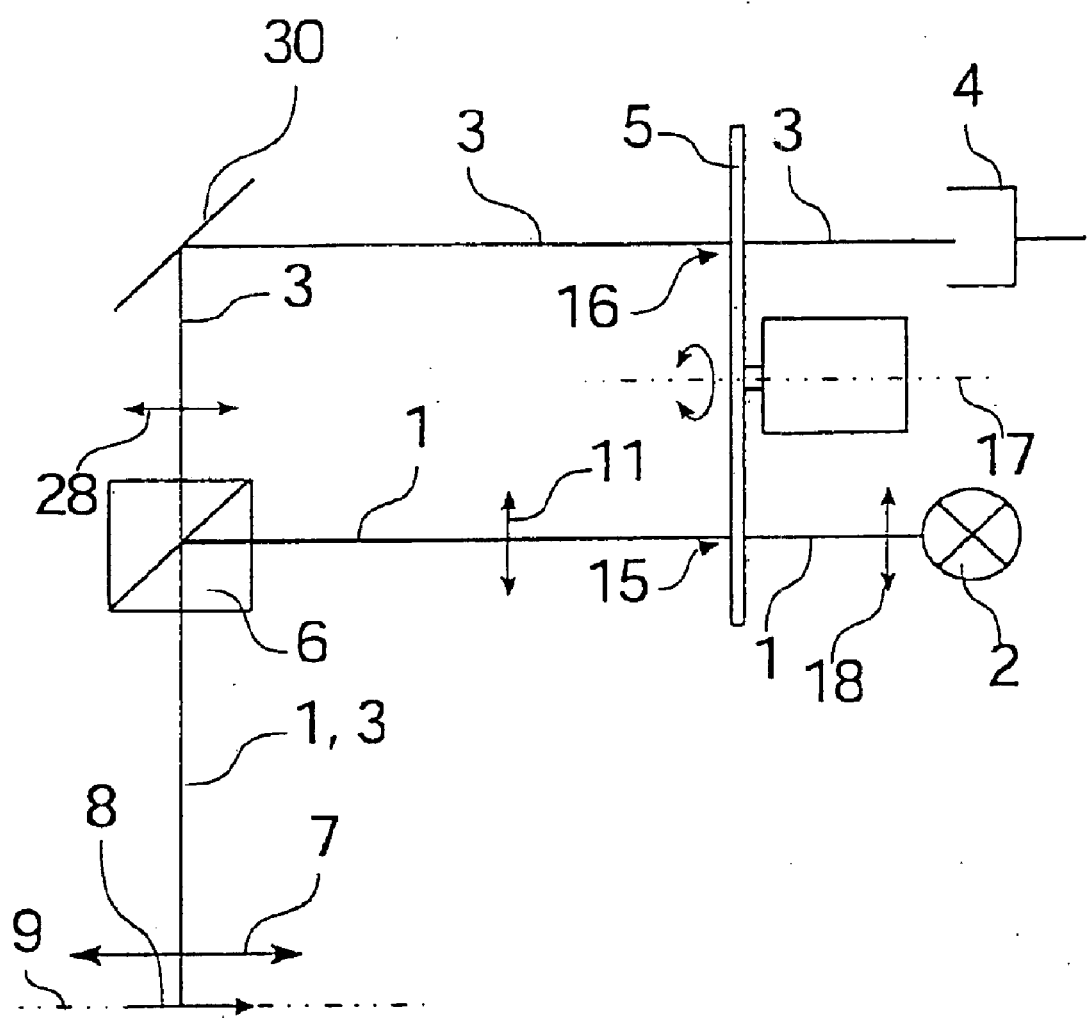
FIG. 1 is a schematic depiction of a confocal microscope known from the existing art.

In a preferred embodiment, provision is made for at least one means for varying the specimen-side focal position of the illuminating light to be provided in the illumination beam path. This means is preferably arranged in the illumination beam path between the light source and the objective. If a transmitted specimen illumination can be implemented by the introduction of beam deflection means and optionally beam-shaping means, it is then possible, using the means for varying the specimen-side focal position of the illumination light, to achieve point-like illumination in the specimen plane of the objective. What ultimately happens is that the specimen-side focal length of the illumination beam path is adapted, by the means for varying the specimen-side focal position of the illuminating light, to the type of illumination that is presently established. In the case of confocal transmitted specimen illumination, therefore, the specimen-side focal length is lengthened by the means for varying the specimen-side focal position of the illuminating light by an amount equal to the optical path corresponding to twice the distance from the specimen plane to the beam deflection means.

The means for varying the specimen-side focal position of the illuminating light is preferably arranged only in the illumination beam path, i.e. between the light source and the means combining and separating the illumination beam path and detection beam path, but preferably between the scanning device and the means combining and separating the illumination beam path and detection beam path.

The means for varying the focal position preferably comprises a variable-focus optical system and/or a lens whose position is variable. The position variation provided in this context is principally along the optical axis of the illumination beam path; a position variation perpendicular thereto, or a tilting of the lens, could also be provided. Advantageously, a variable-focus optical system could be used as the means for varying the focal position; with it, any axial inaccuracies in the positioning of the beam deflection means could be compensated for, since the variable-focus optical system is steplessly adjustable.

As an alternative to this, the variation in focal position could also be accomplished using at least one lens that is introduced into the illumination beam path. In this context, a lens could be received in a corresponding magazine block and positioned in the illumination beam path with the necessary accuracy. Provision could also be made for a lens or lens group arranged in the illumination beam path for the incident specimen illumination mode to be replaced by a different lens or lens group that then adapts the specimen-side focal position of the illuminating light to the transmitted specimen illumination mode.

In a concrete embodiment, the beam deflection means is configured as a mirror. For example, a non-plane mirror adapted to the imaging properties could be used. Alternatively, a concave mirror, in particular a spherical or aspherical concave mirror or a parabolic mirror, would be conceivable. If a plane mirror is used as the beam deflection means, an objective or a lens is provided between the plane mirror and specimen plane. The effect of the plane mirror in conjunction with the objective or lens then corresponds largely to that of a concave mirror.

In a concrete embodiment, the beam deflection means and optionally the beam-shaping means are alignable using a positioning device. It is thereby possible, for example, to ensure that the confocal illumination pinhole imaged into the specimen is optically conjugated with the confocal detection pinhole. The positioning device is preferably displaceable in three spatial directions and/or tiltable about two axes, so that enough degrees of freedom exist for successful alignment of the beam deflection means and optionally the beam-shaping means.

In very particularly preferred fashion, provision is made for the illuminating light, in the case of both transmitted specimen illumination and incident specimen illumination, to be focused in the specimen region only once. Assuming incident specimen illumination, provision is then made for imaging of the illumination pinholes of the confocal disk scanner, or the confocal illumination pinhole, into the specimen plane of the objective. In this context, the illuminating light is focused once in the specimen region. If beam deflection means and optionally beam-shaping means are then introduced into the illumination beam path in order to implement transmitted specimen illumination, the divergent light coming from the objective or specimen could then (assuming an appropriate configuration of the beam deflection means or beam-shaping means) be reflected into itself, so that (again with an appropriate configuration) the illuminating light could be focused again in the specimen plane of the microscope objective. In the context of transmitted specimen illumination, the illumination beam path is preferably configured in such a way that the illuminating light is focused into the specimen plane of the objective only after reflection at the beam deflection means. This could be accomplished, for example, using the means for varying the specimen-side focal position of the illuminating light.

The means combining and/or separating the illumination and detection beam paths could be a polarization beam splitter or a wavelength-specific or dichroic beam splitter. If a polarization beam splitter is used, polarizing and/or polarization-modifying components are provided in the beam path. These are usually a polarizer located after the light source; a λ/4 plate arranged, for example, between the beam deflection means and specimen; and an analyzer. For incident specimen illumination, a λ/4 plate could be arranged between the polarization beam splitter and objective. The ultimate effect of the polarizing and/or polarization-modifying components in the beam path is to block the illuminating light out of the detection beam path so that only the detected light coming from the specimen is directed to the detector or the microscope operator's eye.

If a wavelength-specific or dichroic beam splitter is provided as the beam splitter, further suitable filters and/or beam splitters could be provided so that as a result, fluorescent specimens can be detected or recorded with the confocal microscope. With a suitable light source and selection of the filter sets or wavelength-specific beam splitters that are provided, fluorescent specimens or fluorescent dyes can be excited by multi-photon fluorescent excitation. Especially when the excitation light is focused only once in the context of transmitted specimen illumination, fluorescence is excited only in the specimen plane of the objective, so that in the context of biomedical fluorescent marking in particular, bleaching of the fluorescent markers is, in particularly advantageous fashion, largely prevented.

A Nipkow disk can serve as the scanning apparatus. This usually round disk comprises pinholes or orifices preferably arranged helically. To increase the illumination efficiency, each pinhole of the Nipkow disk could have a microlens associated with it, so that (similarly to the apparatus known from EP 0 727 684) the illuminating light is focused onto the individual pinholes. The numerical aperture of the microlens is adapted to the numerical aperture of the microscope objective. For practical implementation, a "microlens disk" that is arranged parallel to and at an axial offset from the Nipkow disk could be provided, both disks being rotated simultaneously by a corresponding motor.

The scanning apparatus could moreover be configured as a reflective disk scanner as defined in DE 44 37 896 C1.

Here the light from the light source reflected at the reflective disk scanner is advantageously used for specimen illumination; the light not reflected at the reflective disk scanner could, after appropriate transmission, be absorbed by a light trap arranged behind the reflective disk scanner. The amount of scattered light from the light source generated by the reflective disk scanner can thus be minimized, so that as little scattered light as possible is superimposed on the detected light. The use of a reflective disk scanner also allows the overall size to be minimized.

Lastly, the scanning device could also be configured as a mirror scanner, preferably having a mirror arrangement that is known from DE 196 54 219 A1. In this instance, a detection pinhole and optionally an illumination pinhole are provided in the beam path of the microscope in order to achieve confocal imaging.

Fundamentally, provision is made for both the illuminating light and the detected light each to pass through the same pinholes of the Nipkow disk so they can ultimately arrive at the detector. In the case of the reflective disk scanner, illumination and detection of the same disk region is provided for. Preferably, however, the illuminating light strikes in a different region of the disk scanner than the detected light. For example, the illuminating light could illuminate one region of the disk scanner, and the detected light coming from the specimen could, because of the beam guidance of the detection beam path, illuminate a region of the disk scanner that is point-symmetrical to the illumination region in terms of the rotation axis of the disk scanner.

In very particularly advantageous fashion, provision is made for retrofitting a microscope as a confocal microscope by adapting a retrofit kit to the microscope. This retrofit kit could comprise at least a scanning device, beam deflection means, and optionally beam-shaping means, so that the conventional microscope is upgraded to a confocal real-time microscope.

It will be appreciated that there are various ways of advantageously embodying and developing the teaching of the present invention. The reader is referred, for that purpose, to the explanation below of the preferred exemplary embodiments of the invention with reference to the drawings. In conjunction with the explanation of the preferred exemplary embodiments of the invention with reference to the drawings, an explanation is also given of generally preferred embodiments and developments of the teaching.

FIGS. 1 through 4 schematically depict a confocal microscope having an illumination beam path 1 of a light source 2 and a detection beam path 3 of a detector 4. Confocal microscopes furthermore have a scanning device 5, a means 6 for combining and separating illumination beam path 1 and detection beam path 3, and an objective 7. In FIG. 1, specimen 8 is illuminated through objective 7 by means of incident specimen illumination.

Figure 2:
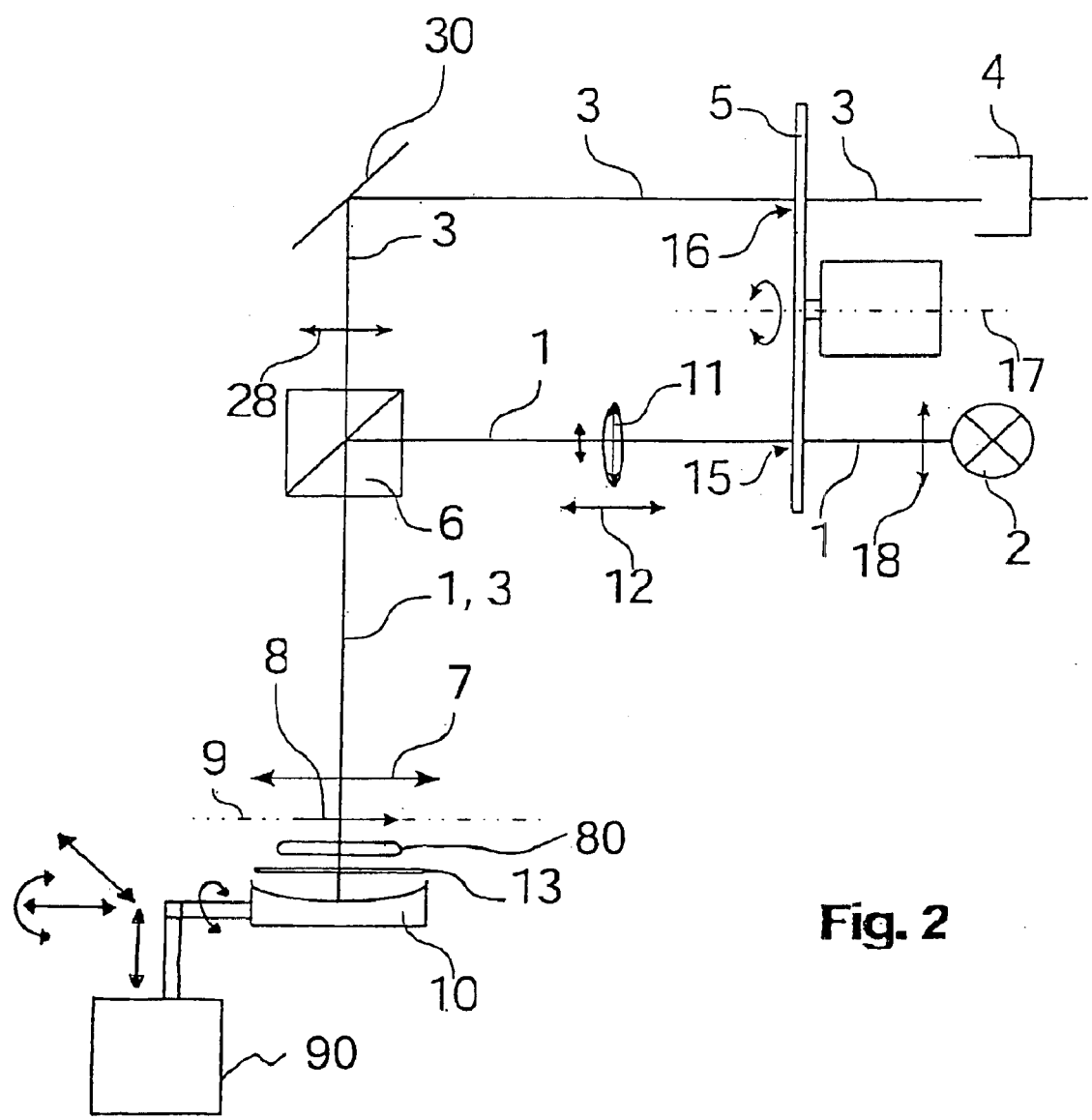
FIG. 2 is a schematic depiction of a first exemplary embodiment of the present invention.
Figure 3:
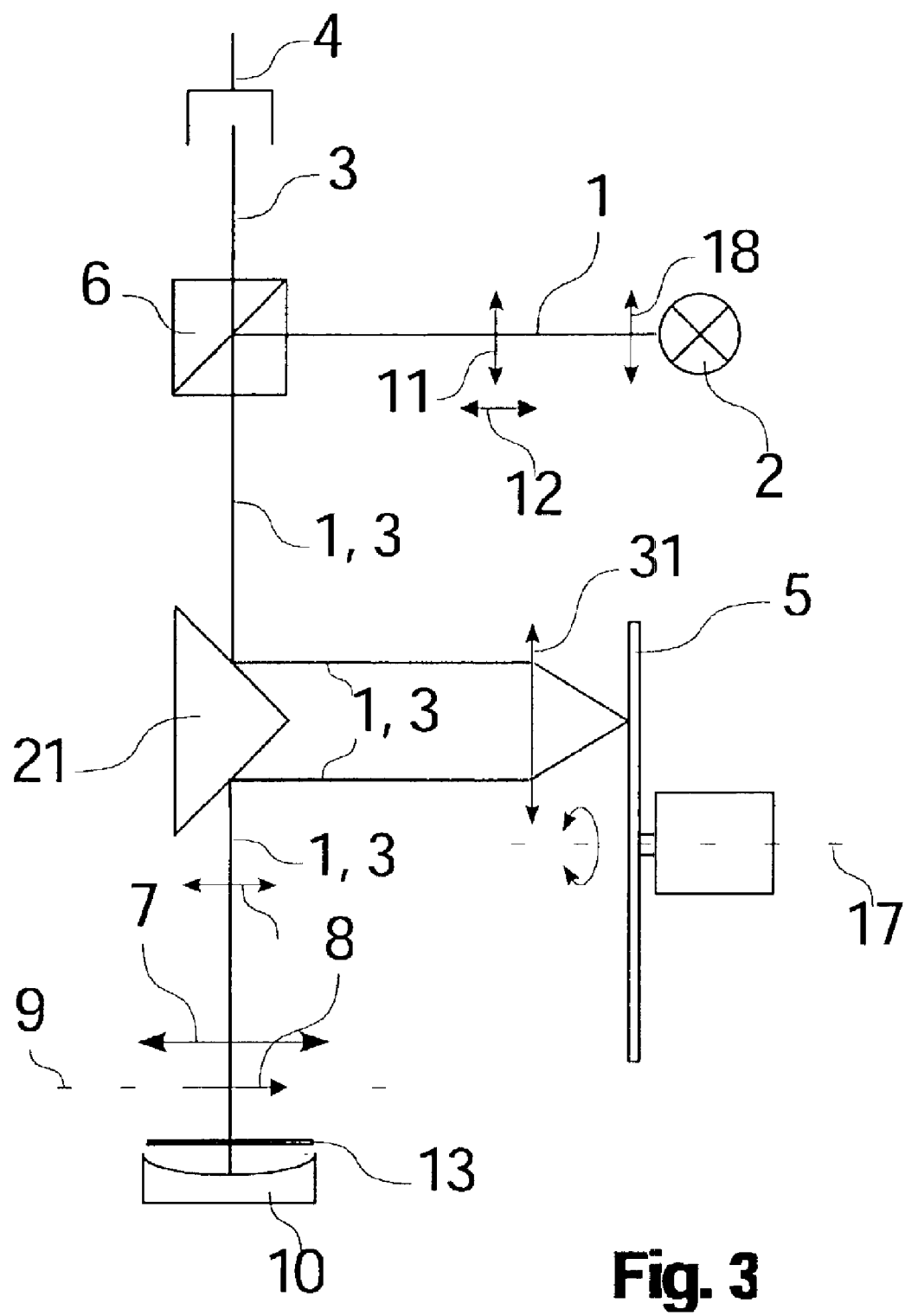
FIG. 3 is a schematic depiction of a further exemplary embodiment of the present invention.
Figure 4:
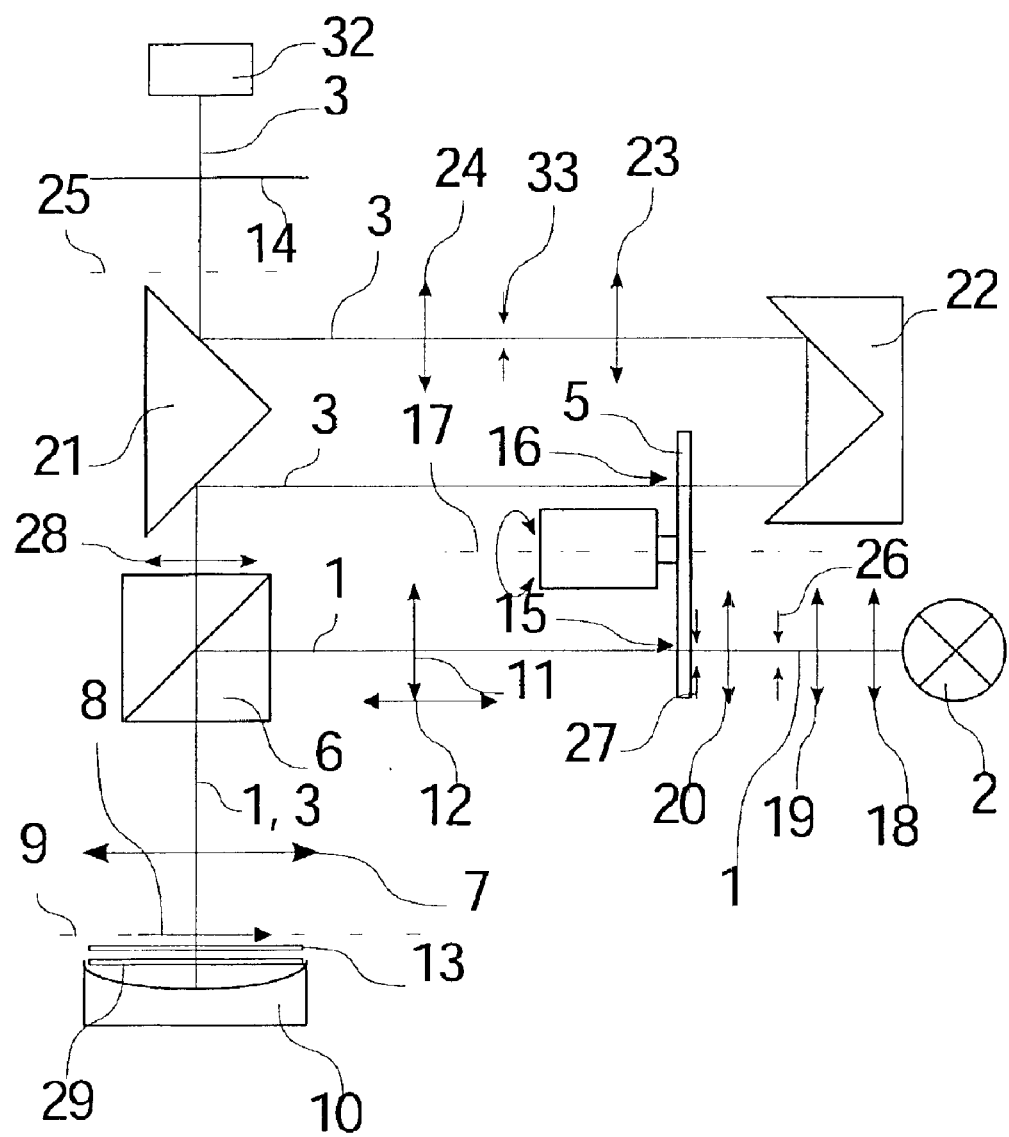
FIG. 4 is a schematic depiction of a further concrete exemplary embodiment of the present invention.

According to the present invention, in order to switch over from an incident specimen illumination occurring through objective 7 to a transmitted specimen illumination occurring toward objective 7, beam deflection means 10 and optionally beam-shaping means 80 can be introduced on the side of specimen plane 9 facing away from objective 7; this is shown in FIGS. 2 through 4. The confocal microscope with incident specimen illumination shown in FIG. 1 can be switched over, by pivoting beam deflection means 10 into the beam path, e.g. to provide the confocal microscope according to the present invention shown in FIG. 2. Such pivoting may be accomplished by positioning device 90.

In FIGS. 2 and 4, a lens 11 for varying the specimen-side focal position of the illuminating light is provided in illumination beam path 1. Displacement of lens 11 along direction 12 thus causes the illumination beam path to be set to the respective specimen illumination mode, as shown e.g. by a comparison of FIG. 1 with FIG. 2.

Beam deflection means 10 is configured as a concave mirror. Means 6 for combining and separating illumination beam path 1 and detection beam path 3 is configured in FIGS. 1 through 3 as a wavelength-specific beam splitter, so that fluorescent specimens can be detected in this context. In the exemplary embodiment shown in FIG. 4, means 6 is configured as a polarization beam splitter. A λ/4 plate 13 is accordingly arranged between specimen plane 9 and concave mirror 10 in order to rotate the polarization direction through 90°. Analyzer 14 is arranged in detection beam path 3 and allows only the light reflected from specimen 8 to pass.

Scanning devices 5 in FIGS. 1, 2, and 4 are configured as Nipkow disks; scanning device 5 of FIG. 3 is configured as a reflective disk scanner.

It is evident from FIGS. 1, 2, and 4 that the illuminating light passes through the Nipkow disk in a region 15. The detected light, on the other hand, is directed via mirror 30 in such a way that it strikes the Nipkow disk in a different region 16. This region is arranged point-symmetrically to region 15 with respect to rotation axis 17. In FIG. 3, the illuminating light and detected light are directed onto the same region of the reflective disk scanner by lens 31 and a mirror-coated prism 21.

The components depicted in somewhat more detail in FIG. 4 will now be discussed. Light source 2 is imaged by means of collector 18 and lens 19, 20 in such a way that a homogeneously illuminated area is created on the Nipkow disk. Lens 11 images each individual illuminated point of the Nipkow disk at infinity. Different points of the Nipkow disk strike the semitransparent specimen 8 as parallel beams at different angles.

Concave mirror 10 is dimensioned in terms of its focal length in such a way that the beams arriving at different angles are focused at different points in specimen 8. The result is to create a point-like illumination in specimen 8, in transmitted specimen illumination mode, as an image of the Nipkow disk. A diffusion disk 29 can be introduced into the beam path in order to decrease confocality and thus increase the depth of focus of the image. Diffusion disk 29 could be embodied, for example, as a computer-generated hologram.

Figure 5:
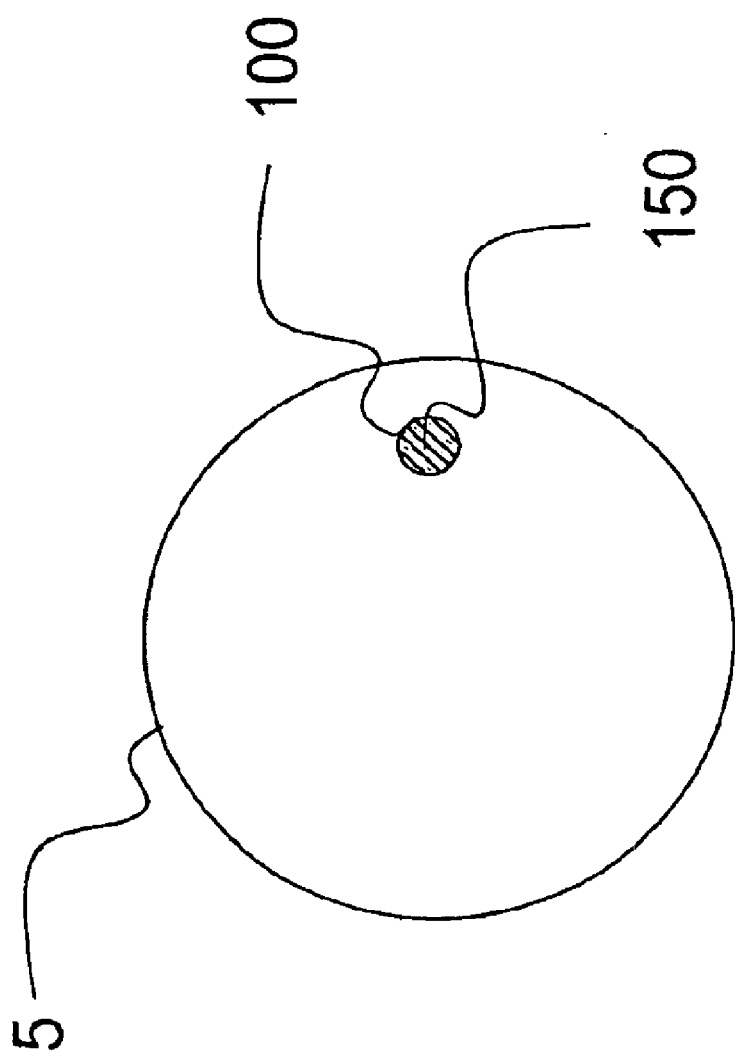
FIG. 5 is a schematic depiction of a Nipkow disk used in an embodiment of the present invention.

The detected light coming from specimen 8 travels through objective 7 and means 6 for combining and separating illumination beam path 1 and detection beam path 3, is reflected a first time by mirror-coated prism 21, and is thereby directed onto region 16 on the Nipkow disk. Only the light coming from specimen 8 that comes directly from specimen plane 9, and can pass through a corresponding pinhole of the Nipkow disk (an exemplary pinhole 100 may be seen in FIG. 5, an exemplary embodiment of a Nipkow disk used in an embodiment of the invention), is reflected twice by retroprism 22. An intermediate image is generated at the usual location in the microscope (in intermediate image plane 25) by lens 23, 24. (It is noted that in some embodiments, a microlens 150 is associated with the pinholes 100.)

Also shown in FIG. 4 are aperture stop 26, field diaphragm 27, and tube lens 28. A CCD camera 32 is arranged on the side of analyzer 14 facing away from the objective.

If the confocal microscope shown in FIG. 4 is operated in the incident specimen illumination mode, lens 11 is to be displaced along direction 12 in such a way that the hole pattern of the Nipkow disk is imaged into specimen plane 9. Concave mirror 10 and λ/4 plate 13 are pivoted out of the beam path. Detection beam path 3 in this instance is identical to the path in the transmitted specimen illumination mode. Baffle plate 33 serves to suppress the scattered light caused by the Nipkow disk.

In conclusion, be it noted very particularly that the exemplary embodiments discussed above serve merely to describe the teaching claimed, but do not limit it to the exemplary embodiments.

Parts List

1 Illumination beam path
2 Light source
3 Detection beam path
4 Detector
5 Scanning device
6 Means for combining and separating (1) and (3)
7 Objective
8 Specimen
9 Specimen plane
10 Beam deflection means, concave mirror
11 Lens
12 Displacement direction of (11)
13 λ/4 plate
14 Analyzer
15 Region
16 Region
17 Rotation axis of (5)
18 Collector
19 Lens
20 Lens
21 Mirror-coated prism
22 Retroprism
23 Lens
24 Lens
25 Intermediate image plane
26 Aperture stop
27 Field diaphragm
28 Tube lens
29 Diffusion disk
30 Mirror
31 Lens
32 CCD camera
33 Baffle plate
80 beam-shaping means
90 positioning device
100 pinhole
150 microlens

What is claimed is:

1. A confocal microscope comprising:
   an illumination beam path of a light source which emits an illuminating light;
   a detection beam path of a detector;
   a scanning device;
   a combining and separating member adapted to combine and separate the illumination beam path and the detection beam path;
   an objective; and
   a beam deflection member, wherein the beam deflection member is adapted so that introduction of the beam deflection member on a side of a specimen plane facing away from the objective switches illumination from incident specimen illumination occurring through the objective to transmitted specimen illumination occurring toward the objective;
   wherein at least one varying member adapted to vary a specimen-side focal position of the illuminating light is disposed in the illumination beam, between the light source and the objective.

2. The microscope of claim 1, wherein the varying member includes one of a variable-focus optical system or a lens, whose position is variable.

3. The microscope of claim 1, wherein the varying member includes at least one lens adapted to be introduced into the illumination beam path.

4. The microscope of claim 1, wherein the beam deflection member is configured as a mirror.

5. The microscope of claim 4, wherein the mirror is configured as one of a non-plane mirror adapted to imaging properties, a spherical concave mirror, an aspherical concave mirror, and a parabolic mirror.

6. The microscope of claim 1, wherein the beam deflection member is alignable using a positioning device, and displaceable in three spatial directions or tiltable about two axes.

7. The microscope of claim 1, wherein the illuminating light is focused in a specimen region only once.

8. The microscope of claim 1, wherein the combining and separating member is one of a polarization beam splitter or a wavelength-specific beam splitter.

9. The microscope of claim 8, wherein one of polarizing, polarization-modifying, or polarization-rotating members is adapted to separation of the illuminating light from a detected light and is disposed in the beam path.

10. The microscope of claim 1, wherein one of filters or beam splitters are provided for fluorescence microscopy.

11. The microscope of claim 10, wherein the illuminating light strikes in a different region of the scanning device than the detected light.

12. The microscope of claim 10, wherein the scanning device is configured as a mirror scanner.

13. The microscope of claim 10, wherein the scanning device is configured as a reflective disk scanner.

14. The microscope of claim 10, wherein the scanning device is configured as a Nipkow disk.

15. The microscope of claim 1, wherein the scanning device is configured as a Nipkow disk having a plurality of pinholes.

16. The microscope of claim 15, wherein each pinhole of the Nipkow disk has at least one microlens associated with it.

17. The microscope of claim 1, wherein the scanning device is configured as a reflective disk scanner.

18. The microscope of claim 1, wherein the scanning device is configured as a mirror scanner.

19. The microscope of claim 1, further comprising a beam-shaping member adjacent the beam deflection member.

20. The microscope of claim 19, wherein the beam-shaping member is configured as one of a lens or an objective.

21. The microscope of claim 19, wherein the beam-shaping member is alignable using a positioning device, and displaceable in three spatial directions or tiltable about two axes.

22. The microscope of claim 1, wherein the combining and separating member is a beam splitter, wherein the beam deflection member is configured as a mirror, and wherein the varying member includes one of a variable-focus optical system or a lens.

* * * * *